(12) United States Patent
Kwon et al.

(10) Patent No.: US 9,357,570 B2
(45) Date of Patent: May 31, 2016

(54) OPERATING METHOD OF ACCESS POINT (AP) AND STATION FOR COEXISTENCE OF BASIC SERVICE SETS HAVING DIFFERENT BANDWIDTHS

(71) Applicant: Electronics and Telecommunications Research Institute, Daejeon (KR)

(72) Inventors: Hyoung Jin Kwon, Cheongju (KR); Min Ho Cheong, Daejeon (KR); Jae Seung Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 141 days.

(21) Appl. No.: 14/067,772

(22) Filed: Oct. 30, 2013

(65) Prior Publication Data
US 2014/0119303 A1  May 1, 2014

(30) Foreign Application Priority Data

Oct. 30, 2012 (KR) .................. 10-2012-0121061
Oct. 29, 2013 (KR) .................. 10-2013-0129366

(51) Int. Cl.
| | | |
|---|---|---|
| *H04W 4/00* | (2009.01) | |
| *H04W 76/02* | (2009.01) | |
| *H04W 74/08* | (2009.01) | |
| *H04W 92/20* | (2009.01) | |
| *H04W 72/12* | (2009.01) | |
| *H04W 84/12* | (2009.01) | |
| *H04W 88/08* | (2009.01) | |

(52) U.S. Cl.
CPC .......... *H04W 76/02* (2013.01); *H04W 74/0808* (2013.01); *H04W 72/12* (2013.01); *H04W 84/12* (2013.01); *H04W 88/08* (2013.01); *H04W 92/20* (2013.01)

(58) Field of Classification Search
CPC . H04W 72/12; H04W 74/0808; H04W 76/02; H04W 84/12; H04W 88/08; H04W 92/20
USPC ......................................... 370/310, 328, 329
See application file for complete search history.

(56) References Cited

U.S. PATENT DOCUMENTS

| | | | | |
|---|---|---|---|---|
| 6,754,176 | B1 * | 6/2004 | Gubbi et al. ................. | 370/230 |
| 6,865,609 | B1 * | 3/2005 | Gubbi et al. ................. | 709/230 |
| 2003/0012166 | A1 * | 1/2003 | Benveniste ................. | 370/338 |
| 2010/0255800 | A1 * | 10/2010 | Kukani ....................... | 455/166.1 |
| 2011/0110349 | A1 * | 5/2011 | Grandhi ...................... | 370/338 |
| 2011/0196962 | A1 * | 8/2011 | Radier et al. ................ | 709/224 |
| 2011/0199966 | A1 * | 8/2011 | Cordeiro et al. ............ | 370/328 |
| 2012/0213204 | A1 * | 8/2012 | Noh et al. ................... | 370/331 |
| 2012/0327870 | A1 * | 12/2012 | Grandhi et al. ............. | 370/329 |
| 2013/0235813 | A1 * | 9/2013 | Segev et al. ................ | 370/329 |
| 2014/0016478 | A1 * | 1/2014 | Koskela et al. ............. | 370/241 |
| 2014/0086212 | A1 * | 3/2014 | Kafle et al. ................. | 370/331 |
| 2014/0119268 | A1 * | 5/2014 | Chu et al. ................... | 370/312 |
| 2014/0177546 | A1 * | 6/2014 | Kang et al. ................. | 370/329 |
| 2015/0139099 | A1 * | 5/2015 | Lee et al. ................... | 370/329 |

\* cited by examiner

*Primary Examiner* — Phuc Tran
*Assistant Examiner* — Robert Lopata

(57) ABSTRACT

An operating method of an access point (AP) for a coexistence of basic service sets (BSSs) having different bandwidths includes detecting at least one of a first signal having a channel bandwidth of the AP and a second signal having a channel bandwidth narrower than the channel bandwidth of the AP, establishing a BSS having the channel bandwidth of the AP, based on a result of the detecting, and reporting the establishment of the BSS to an adjacent BSS.

8 Claims, 6 Drawing Sheets

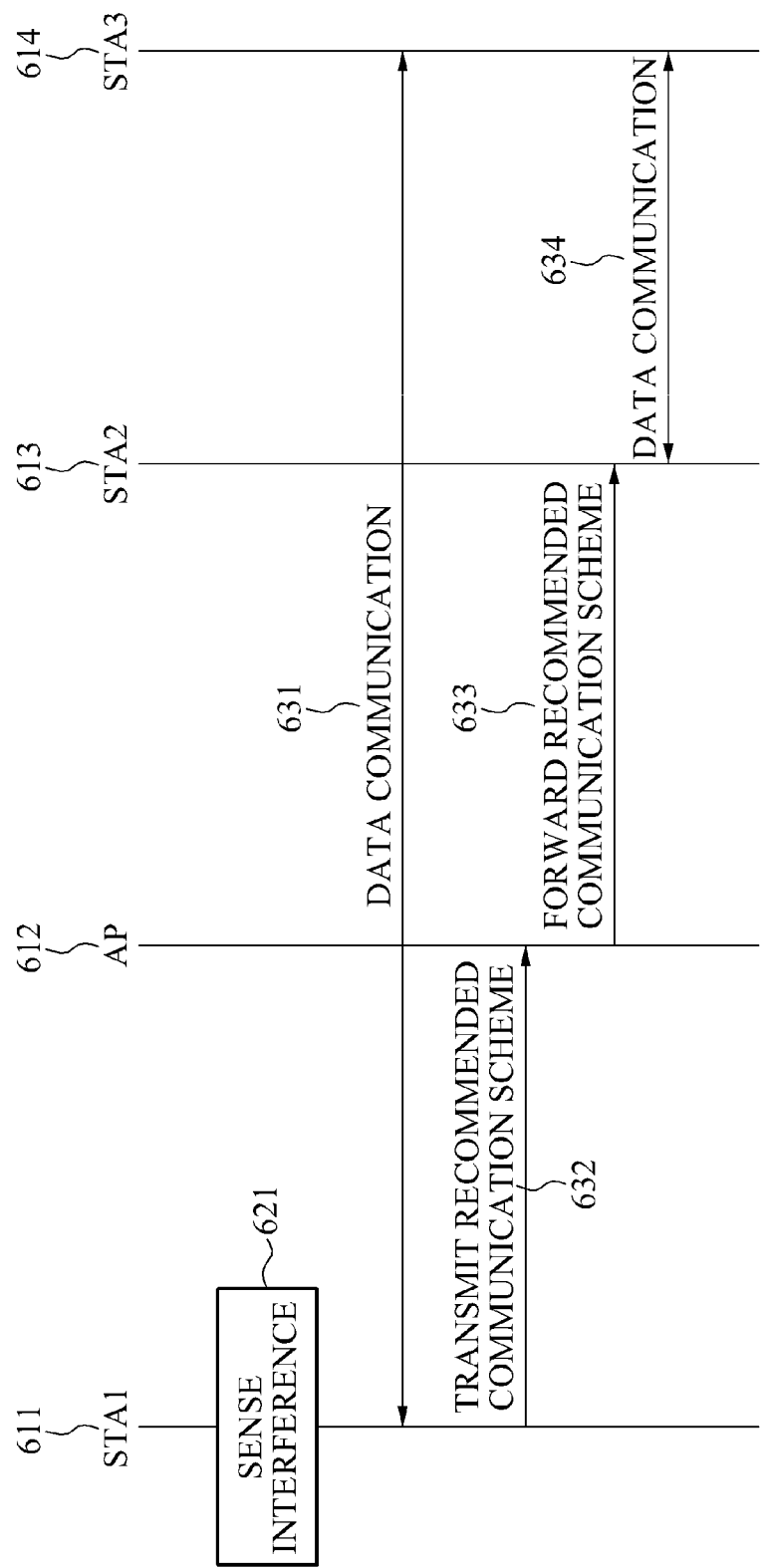

OPERATING METHOD OF ACCESS POINT (AP) AND STATION FOR COEXISTENCE OF BASIC SERVICE SETS HAVING DIFFERENT BANDWIDTHS

CROSS-REFERENCE TO RELATED APPLICATIONS

This application claims the benefit of Korean Patent Application No. 10-2012-0121061 filed on Oct. 30, 2012 and Korean Patent Application No. 10-2013-0129366 filed on Oct. 29, 2013 in the Korean Intellectual Property Office, the disclosures of which are incorporated herein by reference.

BACKGROUND

1. Field of the Invention

The present invention relates to an operating method of an access point (AP) and a station, and more particularly, to an operating method of an AP and a station for a coexistence of basic service sets having different bandwidths.

2. Description of the Related Art

When networks having different channel bandwidths are mixed in a wireless local area network (WLAN) environment, a station (STA) in a short range network may lose a channel access opportunity due to an STA in a relatively long range network since signals having different bandwidths have different ranges. In particular, a long range STA not sensing transmission performed by a pair of short range STAs may initiate transmission while the pair of short range STAs are performing transmission. In this example, when any one of the short range STAs is positioned within a range of the long range STA, a collision may occur with respect to transmission of the corresponding short range STA. In order to alleviate such a collision, before the pair of short range STAs initiate data transmission, a long range Request to Send (RTS) signal and a Clear to Send (CTS) signal may be exchanged to protect subsequent short range data transmission. However, according to the aforementioned method, the long range RTS signal and the CTS signal may have a greater overhead than a short range RTS signal and a CTS signal. Thus, when the long range RTS signal and the CTS signal are added at every data transmission, a serious overhead may occur.

When a short range basic service set (BSS) supports not only an STA using a single bandwidth but also an STA using various bandwidths, a bandwidth duplicate mode in which all such STAs may receive data may be required. The bandwidth duplicate mode includes, for example, a non-high throughput (HT) duplicate mode of the Institute of Electrical and Electronics Engineers (IEEE) 802.11ac standard. The non-HT duplicate mode may use an RTS signal and a CTS signal of a 20 megahertz (MHz) non-HT format, and send an RTS signal and a CTS signal of an identical non-HT format at every 20 MHz when a channel bandwidth of the BSS is greater than or equal to 20 MHz, for example, 40, 80, or 160 MHz. According to the aforementioned method, in a band, for example, sub 1 gigahertz (GHz) of the IEEE 802.11ah standard, in which a regulation on a maximum power transmissible per bandwidth of an apparatus performing wireless communication is present, an amount of power transmitted per unit bandwidth, for example, 20 MHz for a case of the IEEE 802.11ac standard, may decrease as an in-use bandwidth increases. Thus, a range of each RTS signal may also decrease.

SUMMARY

According to an aspect of the present invention, there is provided an operating method of an access point (AP), the method including detecting at least one of a first signal having a channel bandwidth of the AP and a second signal having a channel bandwidth narrower than the channel bandwidth of the AP, establishing a basic service set (BSS) having the channel bandwidth of the AP, based on a result of the detecting, and reporting the establishment of the BSS to an adjacent BSS.

The detecting may include scanning channels based on a unit of the channel bandwidth of the second signal, and setting a clear channel assessment (CCA) level to be a level corresponding to the channel bandwidth of the second signal.

The establishing may include establishing the BSS when the first signal and the second signal are not detected.

The establishing may include establishing the BSS by channel-bonding the channel bandwidth of the second signal.

The reporting may include transmitting a first beacon signal having the channel bandwidth of the first signal to the adjacent BSS, and transmitting a second beacon signal having the channel bandwidth of the second signal.

The second beacon signal may have a transmission period corresponding to an integer multiple of a transmission period of the first beacon signal.

The second beacon signal may be shorter than the first beacon signal.

According to another aspect of the present invention, there is also provided an operating method of a station, the method including detecting at least one of a first signal having a channel bandwidth of the station and a second signal having a channel bandwidth narrower than the channel bandwidth of the station, determining whether a BSS having the channel bandwidth of the station overlaps a BSS having the channel bandwidth of the second signal, based on a result of the detecting, and transmitting a result of the determining to an AP of the BSS having the channel bandwidth of the station.

The detecting may include scanning channels based on a unit of the channel bandwidth of the second signal, and setting a CCA level to be a level corresponding to the channel bandwidth of the second signal.

The scanning may include transmitting a probe request frame based on the unit of the channel bandwidth of the second signal.

According to still another aspect of the present invention, there is also provided an operating method of a station, the method including detecting a second signal having a channel bandwidth narrower than a channel bandwidth of the station, sending and receiving a Request to Send (RTS) signal and a Clear to Send (CTS) signal having the channel bandwidth of the second signal, to protect data, and transmitting information on the channel bandwidth of the second signal to a basic service set (BSS) having the channel bandwidth of the station, to protect data to be transmitted by another station of the BSS having the channel bandwidth of the station.

The information on the channel bandwidth of the second signal may include information that recommends the other station send and receive a RTS signal and a CTS signal having the channel bandwidth of the second signal.

The sending and receiving may include transmitting the data using a duplicate mode based on a unit of the channel bandwidth of the second signal.

The transmitting of the data using the duplicate mode may include transmitting the data using a portion of a multi-band of the duplicate mode.

The detecting may include detecting a sub-channel in which a BSS having the channel bandwidth of the second signal is present, and the transmitting of the data using the duplicate mode may include transmitting the data through the sub-channel.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 is a flowchart illustrating another operating method of an AP and a station for a coexistence of BSSs having different bandwidths.

DETAILED DESCRIPTION

Figure 1:
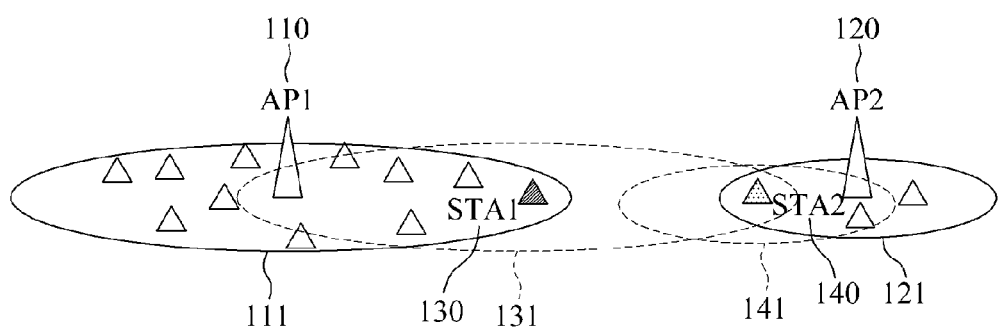
FIG. 1 is a diagram illustrating basic service sets (BSSs) having different bandwidths.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to exemplary embodiments of the present invention, when basic service sets (BSSs) having different channel bandwidths and thus, having different ranges of signal are present in a wireless local area network (WLAN) environment, in particular, when a BSS having a relatively broad band and thus, performing short range communication, and a BSS having an overlapping BSS (OBSS) relationship with the short range BSS and performing long range communication are present, an access point (AP) of the short range BSS may consecutively send a short range beacon and a long range beacon. In this example, the long range BSS adjacent to the short range BSS may listen to the long range beacon and detect a presence of the short range BSS.

After the presence of the short range BSS is reported to the long range BSS, for a coexistence of the BSSs having different bandwidths, rules for BSS establishment or rules for channel change may be variously applied. For example, the long range BSS may set rules according to clear channel assessment (CCA) levels of two received beacons, and may not establish a BSS or may move to another channel. In addition, BSSs having different channel bandwidths may set new coexistence rules to share channels in a form of time sharing.

According to exemplary embodiments of the present invention, when an AP of a short range BSS requests an STA of the short range BSS to perform OBSS scanning, the STA of the short range BSS may scan channels based on a unit of a basic bandwidth of a narrow-band BSS, in order to detect the narrow-band BSS adjacent to a wide-band BSS which the STA of the short range BSS belongs to. In particular, the STA of the short range BSS may perform active scanning based on the unit of the narrow bandwidth. A list of channels detected by the STA of the short range BSS through the OBSS scanning may be reported to the AP of the short range BSS, and the AP of the short range BSS may recognize a presence of the long range BSS through the channel list. In this example, the AP of the short range BSS may report an OBSS state to the STA included in the BSS which the AP belongs to, and induce use of a long range RTS signal and a long range CTS signal when transmitting data in a channel in which an OBSS exists, in order to protect data to be transmitted by an STA positioned at a boundary of the short range BSS.

In addition, an STA of a long range BSS may perform OBSS scanning based on a 1 megahertz (MHz) unit. When the STA of the long range BSS listens to a long range beacon transmitted by a short range BSS, the STA of the long range BSS may report a reception of the beacon to an AP of the long range BSS. In this example, the AP of the long range BSS may induce an STA positioned at a boundary of the long range BSS to exchange frames through a short range modulation and coding scheme (MCS).

Exemplary embodiments of the present invention suggest a method for a coexistence of BSSs having different bandwidths in an identical channel. In particular, a method of protecting data to be transmitted by a short range BSS through a beaconing method of reporting a presence of a short range BSS to a long range BSS incapable of sensing the short range BSS, a method in which an STA of a short range BSS detects a long range BSS, and a method in which an STA of a long range BSS detects a short range BSS may be provided.

Exemplary embodiments of the present invention relate to a case in which BSSs having different channel bandwidths and thus, having different ranges of signal are present in a WLAN. Although the Institute of Electrical and Electronics Engineers (IEEE) 802.11ac standard of a 2.4 gigahertz (GHz) or 5 GHz band supports a multi-band, a beacon may be sent in a single band, for example, 20 MHz, and thus, a coverage of the beacon may be identical. In addition, in order to cover a communication radius of an AP, the IEEE 802.11ac standard defines a bandwidth duplicate mode. The bandwidth duplicate mode defined by the IEEE 802.11ac is referred to as a non-high throughput (HT) duplicate mode. The non-HT duplicate mode may utilize a frame structure of the IEEE 802.11a standard using a 20 MHz bandwidth, as it is. In addition, the non-HT duplicate mode may apply phase shift to two, four, and eight bands and transmit an identical frame, while maintaining an identical 20 MHz packet structure with respect to 40, 80, and 160 MHz bands. A packet of the non-HT duplicate mode may be supported by three standards, for example, IEEE 802.11a, IEEE802.11n, and IEEE 80211ac, operated at 5 GHz and thus, may be used for compatibility maintenance when a control frame and a management frame are transmitted. In addition, the packet of the non-HT duplicate mode may be used for an RTS frame and a CTS frame to support dynamic bandwidth transmission.

Recently, the IEEE 802.11ah standard has been defined as a WLAN standard that supports a multi-band of 1, 2, 4, 8, and 16 MHz in a new band below 1 GHz, rather than an existing band. The IEEE 802.11ah standard defines 2, 4, 8, and 16 MHz bandwidth modes reduced to $\frac{1}{10}$ of 20, 40, 80, and 160 MHz bandwidths of the IEEE 802.11ac standard. A 1 MHz bandwidth mode is defined as a mode that may have 32 subcarriers while maintaining an orthogonal frequency division multiplexing (OFDM) symbol structure. Since the 1 MHz bandwidth mode utilizing a frequency domain iterative transmission scheme has a relatively low transmission rate, but a relatively low operating signal-to-noise ratio (SNR), a signal may be transmitted farthest.

Although a basic mode is yet to be determined, all reception ends may need to support both a 1 MHz mode and a 2 MHz mode. In addition, the 1 MHz mode may be operated in a band below 1 GHz with a battery power, similar to a sensor type STA, reduce an amount of power to be used by an STA using a low data rate, and extend a coverage to 1 kilometer (Km). Accordingly, when the 1 MHz mode is set as a basic mode and 1, 2, 4, 8, and 16 MHz modes are used, a BSS including STAs using at least 2 MHz modes may use an unnecessary air time.

Exemplary embodiments of the present invention suggest a coexistence method that may resolve an issue of an unfair transmit opportunity (TXOP) depending on ranges of apparatuses that transmit data in each bandwidth, when transmission modes having a plurality of channel bandwidths are present in a single band, similar to the IEEE 802.11ah standard.

Exemplary embodiments of the present invention may divide BSSs into a 1 MHz mode BSS and a 2 MHz mode BSS.

The 2 MHz mode BSS refers to a BSS that supports at least 2 MHz bandwidths, for example, 2, 4, 8, and 16 MHz bandwidths. That is because a basic unit of a duplicate mode may have a 2 MHz frame format in the 2 MHz mode BSS. The 2 MHz mode BSS may transmit a 2 MHz beacon. The 2 MHz mode BSS may transmit the 2 MHz beacon in a 2 MHz primary channel at 4, 8, and 16 MHz. An STA of the 2 MHz mode BSS may basically perform 2 MHz physical layer convergence procedure (PLCP) protocol data unit (PPDU) transmission, and perform, as an exception, 1 MHz PPDU transmission of several control frames and management frames, such as an RTS signal and a CTS signal or a beacon, for a coexistence with an adjacent BSS. A frame to be transmitted using the 1 MHz PPDU in the 2 MHz mode BSS may be transmitted in a form of an optimized short frame, when compared to an existing frame, to reduce a channel occupancy.

In contrast to the 2 MHz mode BSS, the 1 MHz mode BSS may have a frame format in which a basic unit of a duplicate mode is 1 MHz. Accordingly, the 1 MHz mode BSS may transmit a beacon through a 1 MHz frame in a 1 MHz primary channel. The 1 MHz mode BSS may support a multi-band of 1, 2, 4, 8, and 16 MHz when 1 MHz is a basic mode. For example, 900 MHz band channelization of Korea corresponds to 917.5 MHz to 923.5 MHz, and channel-bonding of at most 4 MHz may be possible. In this example, a relatively few number of channels are provided. Accordingly, when the 1 MHz mode BSS is used while the 2 MHz mode BSS is not used, the 1 MHz mode BSS may use 1, 2, and 4 MHz bandwidths.

In exemplary embodiments of the present invention, a 1 MHz mode and a 2 MHz mode may be used simultaneously. In addition, the 1 MHz mode is a mode mainly for a sensor type STA. Due to a coexistence issue of a 1 MHz mode BSS and a 2 MHz mode BSS, a multi-band may be limited to a 1 MHz BSS and a 1 MHz/2 MHz BSS. Here, the 1 MHz BSS refers to a BSS that allows 1 MHz PPDU transmission of an STA, and the 1 MHz/2 MHz BSS refers to a BSS that allows both 1 MHz PPDU transmission and 2 MHz PPDU transmission.

FIG. 1 is a diagram illustrating BSSs having different bandwidths.

Referring to FIG. 1, an AP1 110 included in a long range BSS, an AP2 120 included in a short range BSS, an STA1 130 included in the long range BSS, and an STA2 140 included in the short range BSS are illustrated. In addition, a range 111 of a beacon signal transmitted by the AP1 110, a range 121 of a beacon signal transmitted by the AP2 120, a range 131 of a signal transmitted by the STA1 130, and a range 141 of a signal transmitted by the STA2 140 are illustrated. Transmission ranges and detection ranges with respect to the signals of the APs 110 and 120 and the STAs 130 and 140 may be identical.

An STA of each BSS may not listen to a beacon of an adjacent BSS, and the two BSS may not be detected by OBSS scanning. Thus, the BSSs may be configured as shown in FIG. 1. In this example, the two BSSs may share a 1 MHz channel.

The STA1 130 may transmit a signal in a 1 MHz band, and the STA2 140 may transmit a signal in a 2 MHz band. Accordingly, the signal transmitted by the STA1 130 and the signal transmitted by the STA2 140 may have different ranges. In this example, the STA2 140 may detect the long range signal of the STA1 130, whereas the STA1 130 may not detect the signal transmitted by the STA2 140. When the bands of the two signals are identical, such an issue may not occur. Although powers, modulation operations, and coding operations of the 1 MHz band signal and the 2 MHz band signal are identical, the range of the 1 MHz band signal may be greater than the range of the 2 MHz band signal by a factor of two in theory, and by a factor of about 1.5 in reality.

In a situation as shown in FIG. 1, the STA2 140 of the 2 MHz BSS may lose a TXOP due to the adjacent 1 MHz BSS. An STA included in the 2 MHz BSS may protect a data transmission section of a 2 MHz frame using a 1 MHz RTS signal and a 1 MHz CTS signal having a coverage of the 1 MHz signal, in order to obtain a TXOP. A 1 MHz mode may be used for data transmission and exchange of a control frame or a management frame. In an exemplary embodiment of the present invention, a method of reducing an overhead occurring when the 1 MHz mode is used partially in a 2 MHz mode will be suggested.

The 2 MHz mode BSS may consecutively send a 2 MHz beacon and a 1 MHz beacon, in order to extend a range of a signal of the 2 MHz mode BSS. A coverage of the 2 MHz BSS may be limited to an STA listening to the 2 MHz beacon. Accordingly, the 1 MHz beacon may be used to report a presence of the 2 MHz mode BSS to an adjacent BSS, in particular, the 1 MHz mode BSS, and protect frame of the 2 MHz mode BSS, rather than being used to provide information for an association of STAs or information to an associated STA.

In order to reduce an overhead caused by an additional 1 MHz beacon, the 2 MHz mode BSS may send the 1 MHz beacon based on a predetermined transmission period, rather than sending the 1 MHz beacon at every beacon interval. In addition, the 2 MHz mode BSS may optimize a format of the 1 MHz beacon. In particular, an STA in the 2 MHz mode BSS may listen to the 2 MHz beacon. Accordingly, the 2 MHz mode BSS may send a short 1 MHZ beacon including information required to be provided to the adjacent BSS.

The 2 MHz mode BSS may perform OBSS scanning based on a 1 MHz unit, in order to extend a detection range of a signal of the 2 MHz mode BSS. In addition, an AP desiring to establish a 2 MHz mode BSS may scan channels based on the 1 MHz unit, and set a CCA level to be 3 decibels (dB) lower than a 2 MHz mode (due to a half bandwidth), thereby detecting a signal from a further distance although the signal is transmitted with an identical power.

The 2 MHz mode BSS may have a capability of transmitting and detecting the 1 MHz signal, through the two methods described above. Accordingly, the 2 MHz mode BSS may have the same transmission and reception range as the 1 MHz mode BSS and thus, may coexist with the 1 MHz mode BSS under equal conditions although the adjacent 1 MHz mode BSS is present.

Figure 2:
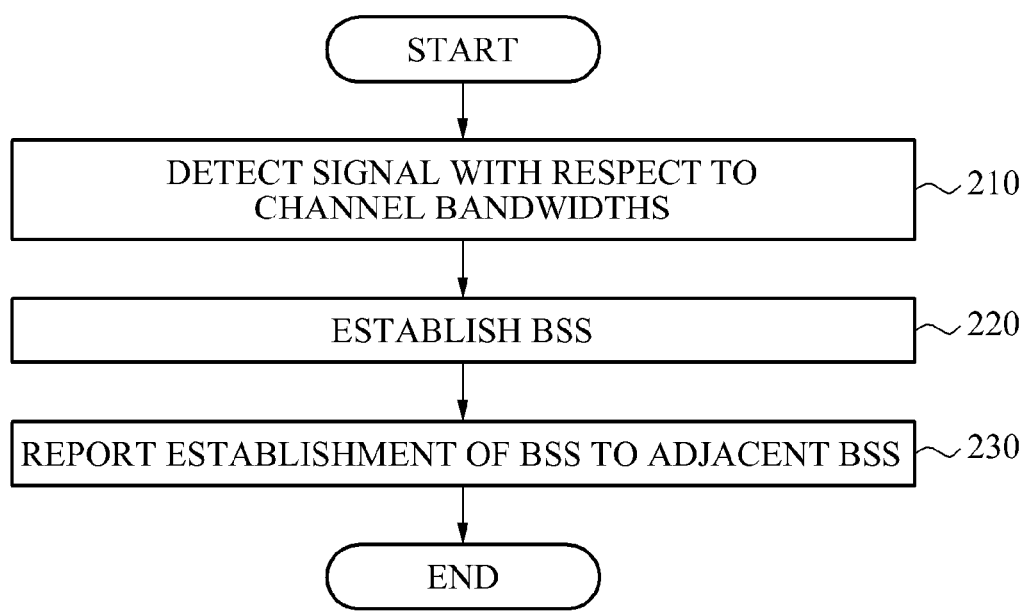
FIG. 2 is a flowchart illustrating an operating method of an access point (AP) for a coexistence of BSSs having different bandwidths.

FIG. 2 is a flowchart illustrating an operating method of an AP for a coexistence of BSSs having different bandwidths.

Referring to FIG. 2, in operation 210, the AP may detect a signal with respect to a plurality of channel bandwidths. The plurality of channel bandwidths may correspond to a signal of a 1 MHz mode BSS and a signal of a 2 MHz mode BSS.

The signal may be detected through channel scanning. For example, the AP desiring to establish a 2 MHz mode BSS may perform OBSS scanning based on a 1 MHz unit, in order to extend a detection range of the signal of the 2 MHz mode BSS. In addition, the AP desiring to establish a 2 MHz mode BSS may scan channels based on a 1 MHz unit and adjust a CCA level to correspond to 1 MHz. The AP desiring to establish a 1 MHz mode BSS may perform OBSS scanning based on a 1 MHz unit.

In operation 220, the AP may establish a BSS. The plurality of channel bandwidths may correspond to a signal of a 1 MHz mode BSS and a signal of a 2 MHz mode BSS. When the AP desiring to establish a 2 MHz mode BSS listens to a 1 MHz beacon, the AP may not establish a BSS in a corresponding channel, and may search for another channel. When the AP desiring to establish a 2 MHz mode BSS does not listen to the 1 MHz beacon, the AP may channel-bond 1 MHz and establish a 2 MHz mode BSS.

When the AP desiring to establish a 1 MHz mode BSS listens to a 1 MHz beacon, the AP may not establish a BSS in a corresponding channel. In addition, when the AP desiring to establish a 1 MHz mode BSS listens to a 2 MHz beacon, the AP may not establish a 1 MHz BSS in a corresponding 2 MHz band.

In particular, when the AP desiring to establish a 1 MHz mode BSS listens to one of a 2 MHz beacon and a 1 MHz beacon transmitted by an adjacent BSS, the AP may not establish a BSS in a corresponding channel band in which the 2 MHz mode BSS is established. Since the 1 MHz beacon has a longer range than the 2 MHz beacon, when the AP listens to the 1 MHz beacon, the AP may not establish a BSS in all channel bands written in the corresponding beacon. The AP desiring to establish a 1 MHz mode BSS may establish a 1 MHz mode BSS when the AP listens to neither the 1 MHz beacon nor the 2 MHz beacon of the 2 MHz mode BSS.

In operation 230, the AP may report the establishment of the BSS to the adjacent BSS.

The AP having established the 2 MHz mode BSS in operation 220 may consecutively transmit a 2 MHz beacon and a 1 MHz beacon. The AP may report the establishment of the 2 MHz mode BSS from the AP to a range of a 1 MHz signal through the 1 MHz beacon.

The AP having established the 2 MHz mode BSS in operation 220 may transmit the 1 MHz beacon.

Figure 3:
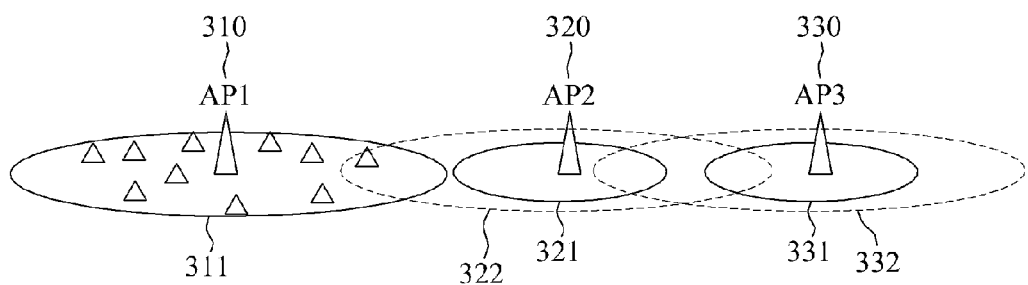
FIG. 3 is a diagram illustrating a process of establishing a short range BSS by an AP in a case in which a long range BSS is established.

FIG. 3 is a diagram illustrating a process of establishing a short range BSS by an AP in a case in which a long range BSS is established.

Referring to FIG. 3, an AP1 310 of a 1 MHz mode BSS, an AP2 320 desiring to establish a 2 MHz mode BSS, and an AP3 330 desiring to establish a 2 MHz mode BSS are illustrated. In addition, a range 311 of a signal transmitted by the AP1 310, ranges 321 and 322 of a signal transmitted by the AP2 320, and ranges 331 and 332 of a signal transmitted by the AP3 330 are illustrated. The ranges 321 and 331 correspond to a 2 MHz mode, and the ranges 322 and 332 correspond to a 1 MHz mode according to an exemplary embodiment of the present invention.

In FIG. 3, the 1 MHz mode BSS of the AP1 310 may have been initially established. An AP desiring to establish a 2 MHz mode BSS may perform OBSS scanning before establishing the BSS. In this example, an STA and an AP operating in a 2 MHz mode may scan channels based on a 1 MHz unit, in order to detect an adjacent BSS operating in a 1 MHz mode.

When the AP2 320 listens to a 1 MHz beacon, the AP2 320 may not establish a BSS in a corresponding channel, and may search for another channel. When the AP3 330 does not listen to a 1 MHz beacon, the AP3 330 may channel-bond 1 MHz in which the beacon is not listened to, and establish a 2 MHz mode BSS. After the BSS is established, the AP3 330 may consecutively transmit a 2 MHz beacon and a 1 MHz beacon to report the establishment of the 2 MHz mode BSS from the AP3 330 to a range of the 1 MHz signal.

Figure 4:
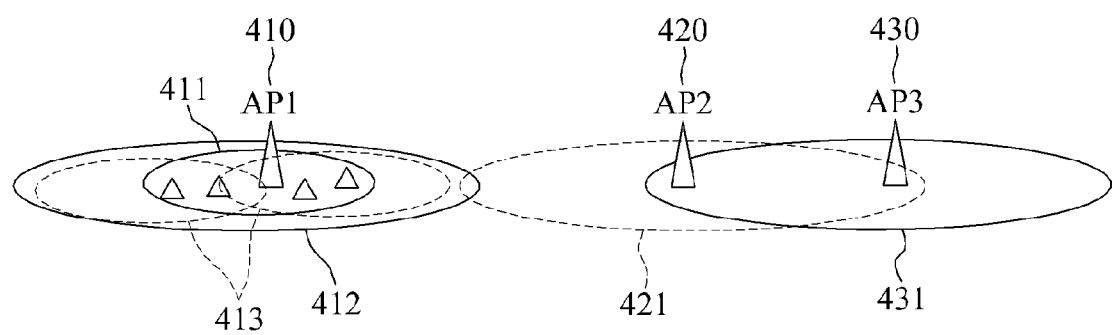
FIG. 4 is a diagram illustrating a process of establishing a long range BSS by an AP in a case in which a short range BSS is established.

FIG. 4 is a diagram illustrating a process of establishing a long range BSS by an AP in a case in which a short mrange BSS is established.

Referring to FIG. 4, an AP1 410 of a 2 MHz mode BSS, an AP2 420 desiring to establish a 1 MHz mode BSS, and an AP3 430 desiring to establish a 1 MHz mode BSS are illustrated. In addition, ranges 411 and 412 of a signal transmitted by the AP1 410, a range 421 of a signal transmitted by the AP2 420, and a range 431 of a signal transmitted by the AP3 430 are illustrated. The range 411 corresponds to a 2 MHz mode, and the range 412 corresponds to a 1 MHz mode according to an exemplary embodiment of the present invention.

In FIG. 4, the 2 MHz mode BSS of the AP1 410 may have been initially established. The AP1 410 may consecutively transmit a 2 MHz beacon to the range 411 and a 1 MHz beacon to the range 412. In this example, in a channel band in which the 2 MHz beacon is transmitted, a 1 MHz channel through which the 1 MHz beacon is to be transmitted may be determined based on a predefined rule. The AP1 410 may transmit a 1 MHz beacon so that the AP2 420 and the AP3 430 listening to the 1 MHz beacon may not establish a BSS in all channel bands written in the 1 MHz beacon.

The AP2 420 and the AP3 430 may perform OBSS scanning based on a 1 MHz before establishing a BSS. When the AP2 420 listens to a 1 MHz beacon, the AP2 420 may not establish a BSS in the corresponding channel. In addition, when the AP2 420 listens to a 2 MHz beacon, the AP2 420 may not establish a 1 MHz BSS in any corresponding 2 MHz band.

When the AP3 430 listens to neither a 1 MHz beacon nor a 2 MHz beacon of the 2 MHz mode BSS, the AP3 430 may establish a 1 MHz mode BSS. After establishing the BSS, the AP3 430 may transmit a 1 MHz beacon.

Figure 5:
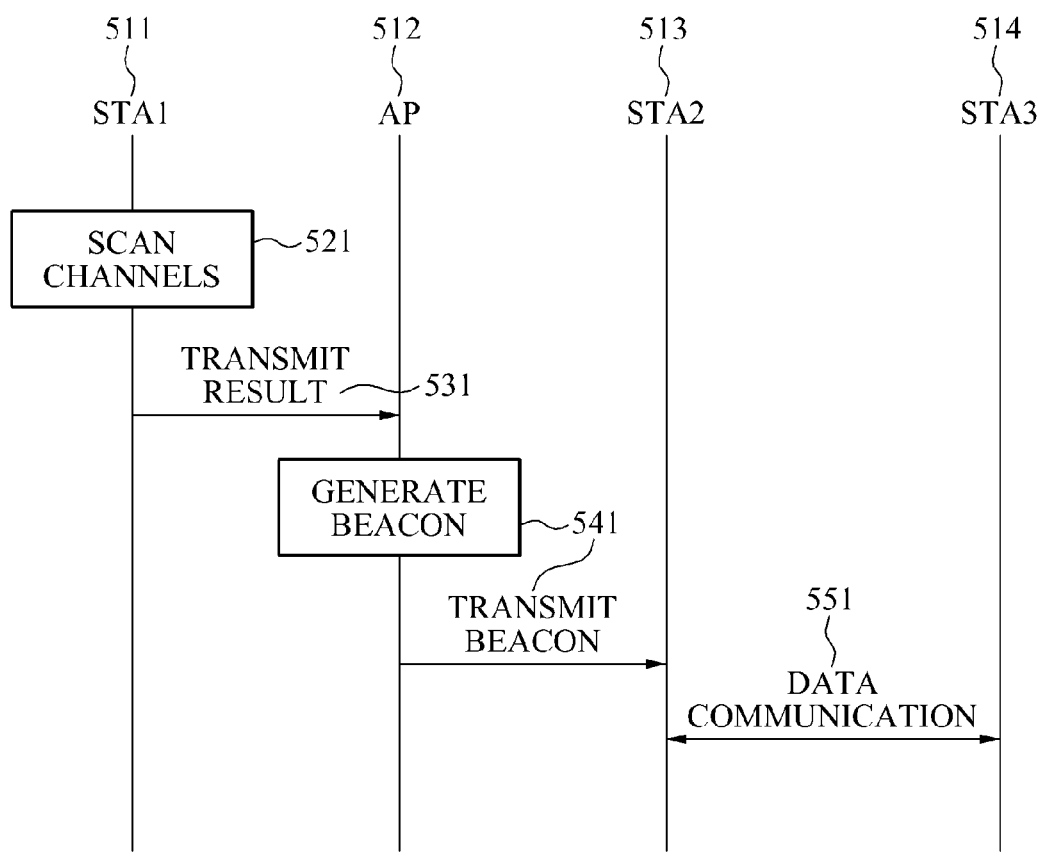
FIG. 5 is a flowchart illustrating an operating method of an AP and a station for a coexistence of BSSs having different bandwidths.

FIG. 5 is a flowchart illustrating an operating method of an AP and a station for a coexistence of BSSs having different bandwidths.

Referring to FIG. 5, in operation 521, an STA1 511 may scan channels. The STA1 511 may include an STA of a 2 MHz mode BSS and an STA of a 1 MHz mode BSS.

The STA of the 2 MHz mode BSS, in particular, an STA at a boundary of the BSS, may still lose a TXOP due to an STA of an adjacent 1 MHz mode BSS. Accordingly, the STA of the 2 MHz mode BSS may scan channels based on a 1 MHz unit. When the STA performs active scanning, other than passive scanning, the STA may transmit a probe request frame having the same MCS as a 1 MHz beacon, based on the 1 MHz unit. Through the foregoing process, the STA may detect a 1 MHz mode BSS existing in a range of a 1 MHz signal from the STA.

The STA of the 1 MHz mode BSS may perform OBSS scanning to detect an adjacent BSS. The channel scanning may be performed based on a 1 MHz unit. The STA of the 1 MHz mode BSS may detect a 1 MHz beacon through the OBSS scanning or detect a 2 MHz mode BSS through a probe request.

In operation 531, the STA1 511 may transmit a corresponding result to an AP 512. The STA1 511 may include an STA of a 2 MHz mode BSS and an STA of a 1 MHz mode BSS. The AP 512 may include an AP of a 2 MHz mode BSS and an AP of a 1 MHz mode BSS. When an adjacent BSS is detected through the OBSS scanning, the STA1 511 may report a presence of the adjacent BSS to an AP of the STA1 511.

In operation 541, the AP 512 may generate a beacon and transmit the generated beacon to an STA2 513. The AP 512 may include an AP of a 2 MHz mode BSS and an AP of a 1 MHz mode BSS. The STA2 513 may be an STA included in the same BSS as the AP 512.

An AP of a 2 MHz mode BSS may define a new field in a beacon and report, to an STA of the 2 MHz mode BSS, a presence of a 1 MHz OBSS in the 2 MHz mode BSS. An AP of a 1 MHz mode BSS may report, to an STA of the 1 MHz mode BSS, a presence of a 2 MHz OBSS in the 1 MHz mode BSS through a beacon or a probe request.

In operation 551, the STA2 513 may perform data communication with an STA3 514. The STA2 513 and the STA3 514 may be STAs included in BSSs of different modes.

The STA2 513 receiving a beacon from an AP of a 2 MHz mode BSS may communicate with the STA3 514 of a 1 MHz mode BSS using a 1 MHz RTS signal and a 1 MHz CTS signal, in order to protect data to be transmitted and received by the STA2 513. In addition, the STA2 513 of a 1 MHz mode BSS may send data, or an RTS signal and a CTS signal, using a short range MCS, since a TXOP of the STA3 514 included in an adjacent 2 MHz mode BSS may be lost due to the data to be transmitted and received by the STA2 513.

FIG. 6 is a flowchart illustrating another operating method of an AP and a station for a coexistence of BSSs having different bandwidths.

An OBSS scanning method of an STA may detect an adjacent BSS through probing or a beacon of an adjacent AP. Accordingly, the OBSS scanning method may not be operated when the STA is not able to listen to a signal of the AP. FIG. 1 illustrates an example of the foregoing case. In FIG. 1, a 1 MHz mode BSS may not detect an adjacent 2 MHz mode BSS, and a signal may reach several STAs at a boundary of the 2 MHz mode BSS adjacent to the 1 MHz mode BSS. FIG. 6 illustrates an exemplary operating process of an STA to supplement such a case.

Referring to FIG. 6, in operation 621, an STA1 611 may sense interference.

The STA1 611 may sense interference by which a 1 MHz mode BSS may not detect an adjacent 2 MHz mode BSS and a signal may reach several STAs at a boundary of the 2 MHz mode BSS adjacent to the 1 MHz mode BSS.

In operation 631, the STA1 613 may perform data communication with an STA3 614.

The STA1 611 of a 2 MHz mode BSS having sensed the interference in operation 621 may transmit a 1 MHz RTS signal and a 1 MHz CTS signal to protect data of the STA1 611.

In operation 632, the STA1 611 may transmit a recommended communication scheme to an AP 612.

When information on an adjacent BSS detected in a corresponding 1 MHz channel, in which interference exists, is not included in a beacon transmitted by the AP 612 belonging to the same BSS as the STA1 611, the STA1 611 may recommend, to the AP 612, a communication scheme using a 1 MHz RTS signal and a 1 MHz CTS signal, before data is transmitted. The STA1 611 may recommend a management frame or a control frame such as a power save poll (PS-POLL) frame be transmitted in a 1 MHz format.

In operation 633, the AP 612 may forward the recommended communication scheme to an STA2 613. The STA2 613 may be an STA included in the same BSS as the AP 612.

In operation 634, the STA2 613 may perform data communication with the STA3 614. The STA2 613 and the STA3 614 may be STAs included in BSSs of different modes. The STA2 613 may perform communication using the scheme recommended by the STA1 611.

An STA included in a 2 MHz mode BSS may perform OBSS scanning. When an adjacent 1 MHz mode BSS is detected as a result of the OBSS scanning, the STA may transmit a 1 MHz RTS signal and a 1 MHz CTS signal before transmitting data. When the 2 MHz mode BSS supports a multi-band, for example, 4, 8, and 16 MHz, and the STA included in the 2 MHz mode BSS uses the multi-band, the data is to be transmitted in a duplicate mode throughout the entire band. In this example, when the STA included in the 2 MHz mode BSS transmits the data using the duplicate mode based on a 1 MHz unit, a range of the RTS signal and the CTS signal may decrease an thus, desired protection may not be achieved.

An STA included in a 2 MHz mode BSS may transmit data in a 1 MHz duplicate mode. However, the STA included in the 2 MHz mode BSS may transmit the data in a specific band, rather than using all bands. For example, an AP included in the 2 MHz mode BSS may assign specific channel numbers to 1 MHz channels in an in-use band of a 1 MHz mode BSS, and set a predefined rule to establish a BSS in an even number channel. The STA included in the 2 MHz mode BSS may send a 1 MHz duplicate mode signal to even number channels. Thus, the STA included in the 2 MHz mode BSS may broaden a coverage, when compared to a case in which all bands are used.

In addition, when the STA included in the 2 MHz mode BSS detects, through OBSS scanning, a 1 MHz sub-channel in which a 1 MHz mode BSS exist, a 1 MHz mode frame may be transmitted in a corresponding sub-channel of the STA included in the 2 MHz mode BSS. For example, the STA may consecutively send a 1 MHz RTS signal to an uplink and an RTS signal of a duplicate mode.

The 1 MHz RTS signal may protect a frame of the 2 MHz mode BSS from the STA of the adjacent 1 MHz mode BSS, through a duration field in which a TXOP limit or a sufficient time for sending data to be transmitted by the STA is reflected. When a CTS signal does not include a sub-frame in which the 1 MHz mode BSS exists, the STA may transmit a contention free end (CF-End) frame to reset a network allocation vector (NAV) or a frame acting the same role, in a 1 MHz mode.

In a case of a downlink, when an AP sends an RTS signal in a duplicate mode, an STA may send a CTS signal to a band of an available sub-channel in the duplicate mode. The STA may transmit a CTS signal or a CTS-to-self frame to a 1 MHz sub-channel in which an adjacent BSS exists, in a 1 MHz mode. The STA may indicate that another CTS signal or another CTS-to-self frame exists subsequent to the transmitted CTS signal, thereby enabling the AP not to transmit data immediately after the CTS signal is received. Accordingly, an STA of an adjacent 1 MHz mode OBSS may set a NAV corresponding to a duration of a dual CTS signal and thus, downlink data transmission may be protected. In addition, frames may be sent in a form of short frames, and be configured to include a preamble in a form of a null data packet (NDP).

According to exemplary embodiments of the present invention, in order to reduce an unfair TXOP caused by a long range BSS incapable of sensing a short range BSS, there are provided a beaconing method in which the short range BSS reports a presence of the short range BSS to the long range BSS, an OBSS channel scanning method in which the long range BSS detects the short range BSS, and an OBSS channel scanning method in which an STA of the short range BSS may detect the long range BSS.

The short range BSS may protect data to be transmitted and received through a long range RTS signal and a long range CTS signal. In addition, the short range BSS may transmit a control frame and a management frame in a long range format to protect the control frame and the management frame.

According to exemplary embodiments of the present invention, by assigning equal TXOPs to STAs included in a short range BSS and a long range BSS that are adjacent to each other, a performance of the short range BSS may be improved.

The methods according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of an access point (AP), the method comprising:
   detecting, by an AP having a first bandwidth, an open channel by scanning channels based on a second bandwidth that is narrower than the first bandwidth;
   establishing a basic service set (BSS) in the open channel, the BSS having the first bandwidth; and
   reporting the establishment of the BSS to an adjacent BSS by consecutively transmitting a first beacon signal having the first bandwidth at a first transmission period and a second beacon signal having the second bandwidth at a second transmission period that is longer than the first transmission period.

2. The method of claim 1, further comprising:
   setting a clear channel assessment (CCA) level to be a level corresponding to the second bandwidth.

3. The method of claim 1, wherein the establishing comprises establishing the BSS by channel-bonding a channel having the second bandwidth.

4. The method of claim 1, wherein the first transmission period corresponding corresponds to an integer multiple of the second transmission period.

5. The method of claim 1, wherein the first bandwidth is 2 MHz.

6. The method of claim 5, wherein the second bandwidth is 1 MHz.

7. The method of claim 1, further comprising:
   requesting a station (STA) of the established BSS to scan channels based on the second bandwidth; and
   when a channel list indicating a detected second bandwidth BSS is received from the STA, inducing the STA to transmit a second bandwidth request to send (RTS) signal and a second bandwidth clear to send (CTS) signal when transmitting in a channel included in the channel list.

8. An operating method of an access point (AP) of a basic service set (BSS), comprising:
   requesting a station (STA) of the BSS having a first bandwidth to perform overlapping BSS (OBSS) scanning, the OBSS scanning including scanning channels based on a second bandwidth, the second bandwidth being narrower than the first bandwidth;
   receiving a channel list detected by the STA as a result of OBSS scanning; and
   inducing the STA to transmit a second bandwidth request to send (RTS) signal and a second bandwidth clear to send (CTS) signal when transmitting in a selected channel listed in the channel list, by reporting the presence of an adjacent BSS in the selected channel to the STA, the adjacent BSS operating in the second bandwidth.

* * * * *